(12) United States Patent
Bodepudi et al.

(10) Patent No.: US 7,895,645 B2
(45) Date of Patent: Feb. 22, 2011

(54) MULTIPLE USER CREDENTIALS

(75) Inventors: Smita Bodepudi, Austin, TX (US);
Medha Dinesh Date, Austin, TX (US);
Murali Neralla, Austin, TX (US);
Prasad Venkata Potluri, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 12/120,000

(22) Filed: May 13, 2008

(65) Prior Publication Data

US 2008/0256609 A1   Oct. 16, 2008

Related U.S. Application Data

(63) Continuation of application No. 11/186,673, filed on Jul. 21, 2005, now abandoned.

(51) Int. Cl.
*H04L 29/06* (2006.01)

(52) U.S. Cl. ................................. 726/5; 726/4

(58) Field of Classification Search ............... None
See application file for complete search history.

(56) References Cited

U.S. PATENT DOCUMENTS 6,996,718 B1 * 2/2006 Henry et al. ................ 713/182
7,085,840 B2 * 8/2006 de Jong et al. .............. 709/229
7,308,707 B2 * 12/2007 Harrison et al. ................ 726/5
7,603,700 B2 * 10/2009 Cheng et al. .................... 726/5
7,624,433 B1 * 11/2009 Clark et al. ..................... 726/9
2003/0229623 A1  12/2003 Chang et al.

OTHER PUBLICATIONS

Shockley, Identification and Authentication when Users have Multiple Accounts, ACM, 1993, pp. 185-191.*

\* cited by examiner

*Primary Examiner*—Minh Dinh
(74) *Attorney, Agent, or Firm*—Yee & Associates, P.C.; Matthew W. Baca (57) ABSTRACT

A login shell and file/directory access checking supporting multiple user credentials are provided. The login shell receives user input from a particular user including login information for a plurality of user accounts for that particular user. The login shell authenticates the plurality of user accounts using the login information and retrieves a plurality of user credentials corresponding to the plurality of user accounts. This plurality of user credentials forms a multi-user credential. In response to a request for access to a file, the access rights to the file for the user are verified by verifying the access rights of the multi-user credential.

19 Claims, 4 Drawing Sheets

MULTIPLE USER CREDENTIALS

This application is a continuation of application Ser. No. 11/186,673, filed Jul. 21, 2005, status pending.

BACKGROUND OF THE INVENTION

1. Field of the Invention

The present invention relates in general to a data processing system and, in particular, to a method, system, and computer program product for supporting multiple user credentials.

2. Description of the Related Art

Currently, whenever any user is logged into a multi-user or network environment, such as AIX or Windows, the loggin shell or environment allows for only one set of user credentials. That is, one user identification (ID), one primary group ID, and one or more secondary group IDs.

A problem arises when a user has more than one user account on a system, user1 and user2, for instance. The problem is that when the user is logged in under one account, user1, the user may only access a file if user1's credentials allow access, regardless of whether or not user2's credentials allow access to that file. Therefore, if a file has only been granted access for a user with user2's credentials, the user is not able to access that file while logged in as user1, even though user2 is also the user's account.

For example, on an AIX system, when a user, say aixuser1, is logged in, the logged in shell has only one user credential, one user ID, one primary group ID and one or more secondary group IDs. In the above example, the user has two user accounts, aixuser1 and aixuser2 and there are some files as follows:

-rw------- 1 aixuser1 staff 631365 June 14 13:56 peruser1.log

-rw------- 1 aixuser2 staff 631365 June 14 13:56 peruser2.log

-rw------- 1 aixuser3 staff 631365 June 14 13:56 peruser3.log

The user cannot access both the files that he has permission to use from a one user credential environment when logged in as aixuser1.

The same is true under a windows environment. When a user is logged in to a Windows environment, the logged environment has only one user credential and one or more group credentials based on the group memberships. The same example mentioned above for the AIX environment also applies to the Windows environment.

Presently, there are three ways to get around these restrictions, but none of these solutions is very satisfactory or efficient. One solution is to create a new group consisting of the two user IDs and set the file's group ID as the newly created group. However, this solution is not practical, because the user needs to be a system administrator to create groups or to change group memberships.

Another solution is to use access control lists (ACLs) to provide access to the second user ID. Every time user1 creates a new file, user1 needs to grant ACL access to user2 and vice-versa. However, a problem arises when the user's IDs change. For example, user2 gets assigned to another user and the user gets assigned a new user ID of user3. Now all the files and directories owned by user1 with ACL access to user2 need to be found and have the ACL access changed to user3 so that the files and directories owned by user1 are secured from user2. Additionally, files and directories that used to belong to user2 may also need to be found and altered.

Another solution is to login as user1, work with the files owned by user1, then logout and login as user2 and work with the files owned by user2. This solution is not very practical as all the files cannot be accessed from one login shell or environment.

SUMMARY OF THE INVENTION

The present invention provides a method, system, and computer program product for supporting multiple user credentials. In the present invention, the method begins by receiving user input from a particular user including login information for a plurality of user accounts for that particular user. The plurality of user accounts is authenticated using the login information. A plurality of user credentials corresponding to the plurality of user accounts is retrieved. This plurality of user credentials forms a multi-user credential. In response to a request for access to a file, the access rights to the file for the user are verified by verifying the access rights of the multi-user credential.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
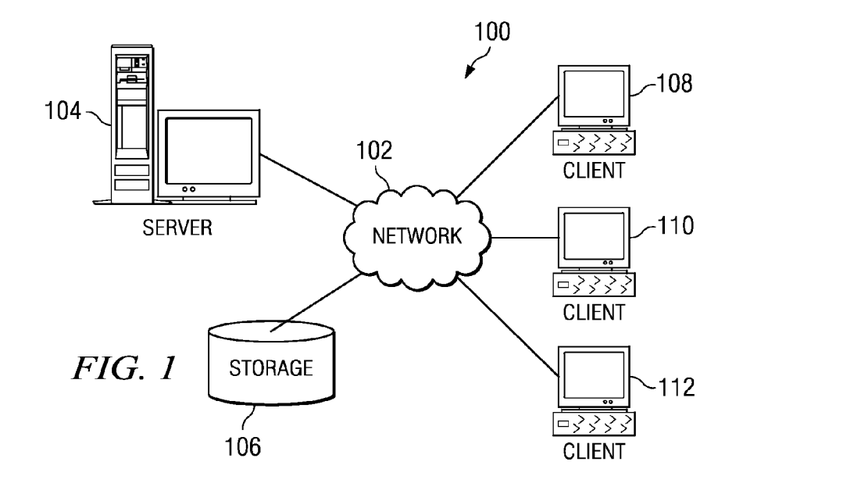
FIG. 1 is a pictorial representation of a network of data processing systems in which exemplary aspects of the present invention may be implemented.
Figure 2:
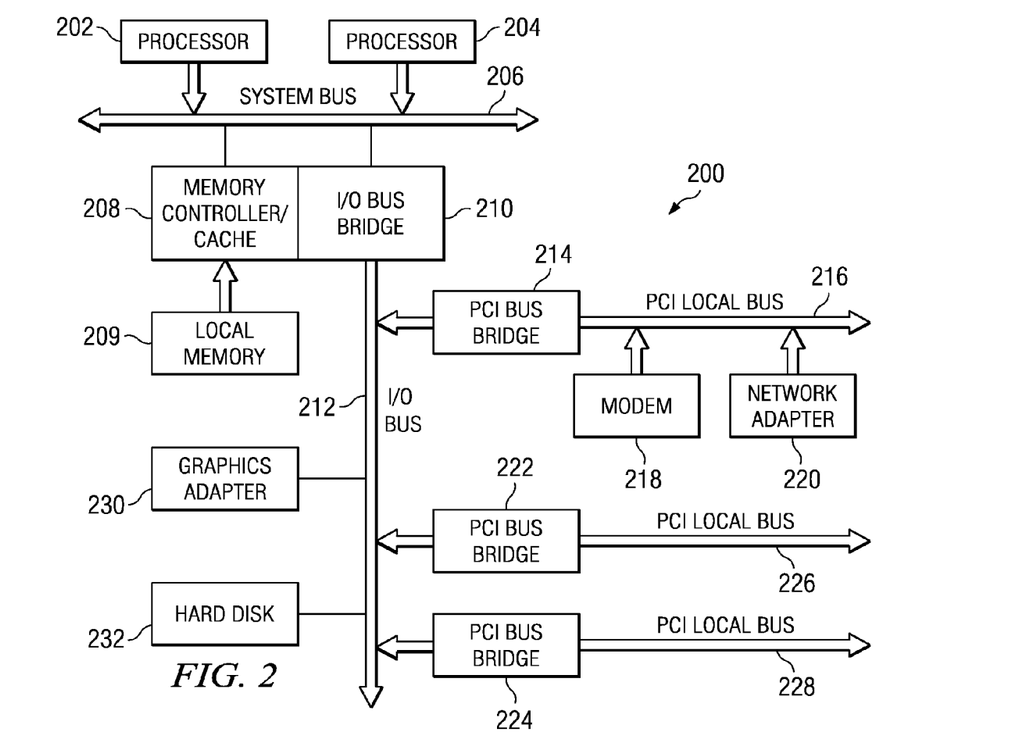
FIG. 2 is a block diagram of a data processing system that may be implemented as a server, in accordance with illustrative embodiments of the present invention.
Figure 3:
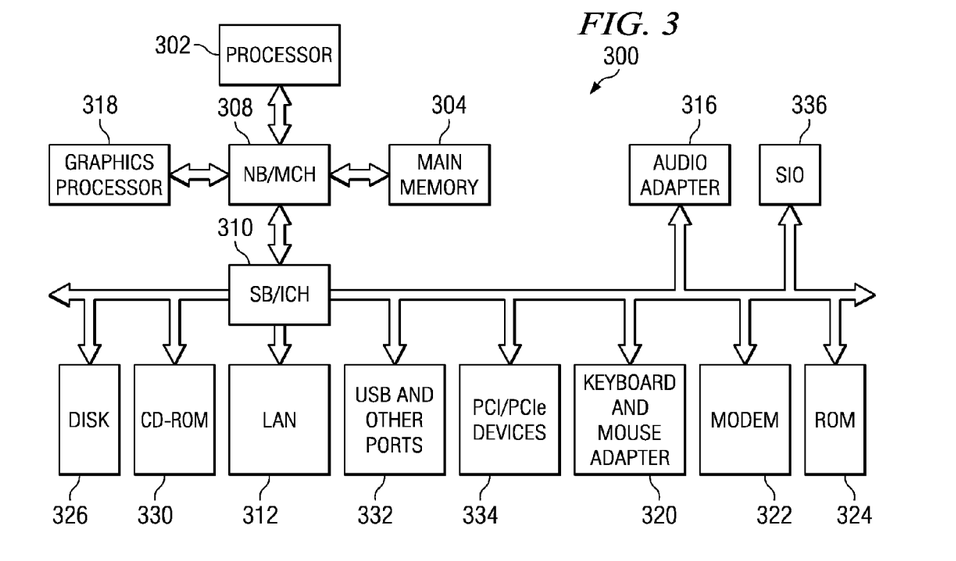
FIG. 3 is a block diagram of a data processing system in which exemplary aspects of the present invention may be implemented.

FIGS. 1-3 are provided as exemplary diagrams of data processing environments in which exemplary aspects of the present invention may be implemented. It should be appreciated that FIGS. 1-3 are only exemplary and are not intended to assert or imply any limitation with regard to the environments in which the present invention may be implemented. Many modifications to the depicted environments may be made without departing from the spirit and scope of the present invention.

With reference now to the figures, FIG. 1 depicts a pictorial representation of a network of data processing systems in which exemplary aspects of the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 connects to network 102 along with storage unit 106. In addition, clients 108, 110, and 112 connect to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with an illustrative embodiment of the present invention. Data processing system 200 may be a symmetric multiprocessor (SMP) system including a plurality of processors 202 and 204 that connect to system bus 206. Alternatively, a single processor system may be employed. Also connected to system bus 206 is memory controller/cache 208, which provides an interface to local memory 209. I/O bus bridge 210 connects to system bus 206 and provides an interface to I/O bus 212. Memory controller/cache 208 and I/O bus bridge 210 may be integrated as depicted.

Peripheral component interconnect (PCI) bus bridge 214 connects to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eserver™ pSeries® computer system, running the Advanced Interactive Executive (AIX®) operating system or LINUX operating system (eServer, pSeries and AIX are trademarks of International Business Machines Corporation in the United States, other countries, or both, while Linux is a trademark of Linus Torvalds in the United States, other countries, or both).

With reference now to FIG. 3, a block diagram of a data processing system is shown in which exemplary aspects of the present invention may be implemented. Data processing system 300 is an example of a computer, such as client 108 in FIG. 1, in which code or instructions implementing the processes of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 connect to ICH 310. PCI/PCIe devices may include, for example, Ethernet adapters, add-in cards, PC cards for notebook computers, etc. PCI uses a card bus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and coordinates and provides control of various components within data processing system 300 in FIG. 3. The operating system may be a commercially available operating system such as the Microsoft® Windows® XP operating system (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 300 (Java is a trademark of Sun Microsystems, Inc. in the United States, other countries, or both).

Instructions for the operating system, the object-oriented programming system, and applications or programs are located on storage devices, such as hard disk drive 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the present invention may be applied to a multiprocessor data processing system. As some illustrative examples, data processing system 300 may be a personal digital assistant (PDA), which is configured with flash memory to provide non-volatile memory for storing operating system files and/or user-generated data.

A bus system may be comprised of one or more buses, such as system bus 206, I/O bus 212 and PCI buses 216, 226 and 228 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 218 or network adapter 220 of FIG. 2 or modem 322 or LAN 312 of FIG. 3. A memory may be, for example, local memory 209 or cache such as that found in memory controller/cache 208 of FIG. 2 or main memory 304 of FIG. 3. A processing unit may include one or more processors or central processing units, such as processor 202 or processor 204 of FIG. 2 or processor 302 of FIG. 3. The depicted examples in FIGS. 1-3 and above-described examples are not meant to imply architectural limitations. For example, data processing system 300 also may be a tablet computer, laptop computer, or telephone device in addition to taking the form of a PDA.

Figure 4:
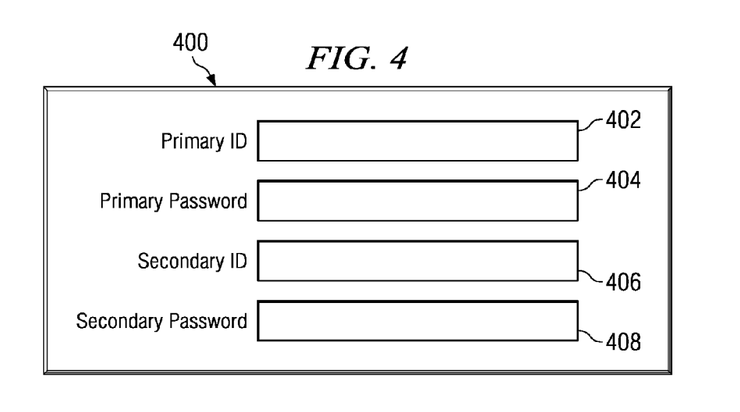
FIG. 4 is a pictorial representation of a login screen in accordance with an exemplary embodiment of the present invention.

FIG. 4 is a pictorial representation of a login screen in accordance with an exemplary embodiment of the present invention. The login screen is designated by reference number 400. Login screen 400 comprises input location 402 for inputting the user's primary ID, input location 404 for inputting the user's password for the user's primary ID, the primary password, input location 406 for inputting the user's secondary ID, and input location 408 for inputting the user's password for the user's secondary ID, the secondary password. While FIG. 4 depicts a login screen capable of accepting two different user IDs and passwords, those skilled in the art will realize that the screen could be modified to accept any number of user IDs and passwords. The depiction of a login screen capable of accepting two different user IDs and passwords is shown to illustrate exemplary aspects of the present invention but is not meant to imply any specific limitations on the invention.

Figure 5:
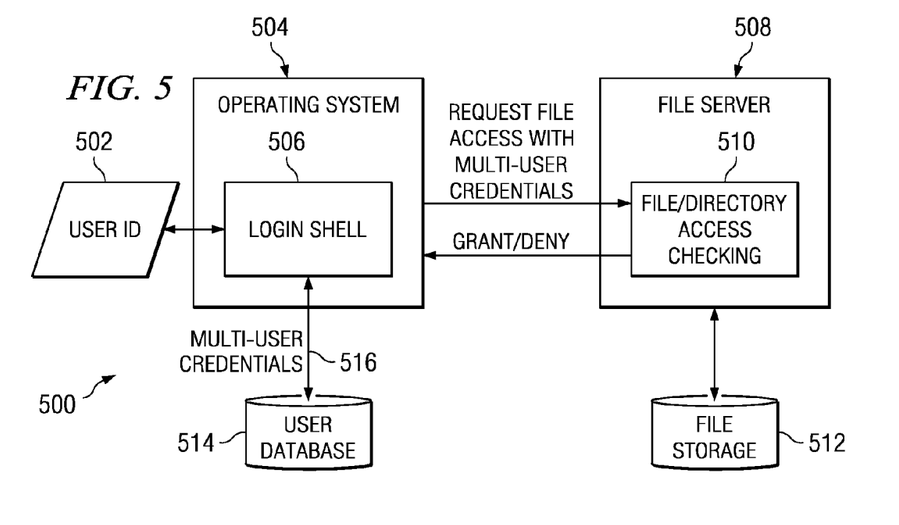
FIG. 5 is a block diagram of a login system in accordance with an exemplary embodiment of the present invention.

FIG. 5 is a block diagram of a login system in accordance with an exemplary embodiment of the present invention. The login system is designated by reference number 500. Login information 502 comprises the users' primary and secondary IDs and passwords. Login information 502 is input into login shell 506 via an input screen, such as input screen 400 in FIG. 4. Login shell 506 is part of operating system (OS) 504. Login shell 506 communicates with user database 514 to obtain multi-user credentials 516.

User credentials comprise the user's ID and the user's primary group ID and any secondary group IDs. Multi-user credentials comprise a set of multiple user credentials for one individual user. In the present example, multi-user credentials 516 comprise the user's primary and secondary IDs and the user's primary and secondary group IDs. In the case of multi-user credentials, the set of secondary group IDs comprises the user's set of secondary group IDs for the user's primary ID, the primary group ID of the user's secondary ID, and the set of secondary group IDs for the user's secondary ID. In order to avoid security issues, the scope of multi-user credentials 516 is the life of login shell 506. While multi-user credentials 516 have been described in terms of comprising a primary user credential and a secondary user credential, multi-user credentials 516 could comprise any number of additional credentials belonging to the user.

A request for file access, along with multi-user credentials 516, is sent to file/directory access checking 510, which is part of file server 508. File/directory access checking 510 communicates with file storage 512 to verify multi-user credentials 516. File/directory access checking 510 sends a response either granting or denying access back to OS 504 depending on the result of the outcome of the verification.

In another exemplary embodiment, user database 514 and file store 512 may be a single entity. In a further embodiment, user data base 514 may be accessed through file server 508 instead of directly by OS 504, as depicted.

Figure 6:
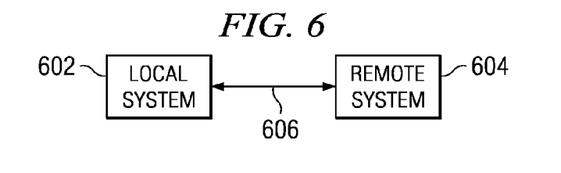
FIG. 6 is a block diagram that illustrates communicating a remote command between two data processing systems in accordance with an exemplary embodiment of the present invention.

FIG. 6 is a block diagram that illustrates communicating a remote command between two data processing systems in accordance with a preferred embodiment of the present invention. Local data processing system 602 communicates with remote data processing system 604 via communications link 606. Local data processing system 602 and remote data processing system 604 may be implemented as a server data processing system, such as server 104 in FIG. 1, a client data processing system, such as client 108 in FIG. 1, processes executing on the same computer or any combinations thereof. Those skilled in the art will realize that communications link 606 comprises many types of communication links including, but not limited to, a network, wireless communication, direct link, or software which makes remote data processing system 604 appear to be a remote system even when it is resident on the same data processing system as local data processing system 602.

Figure 7:
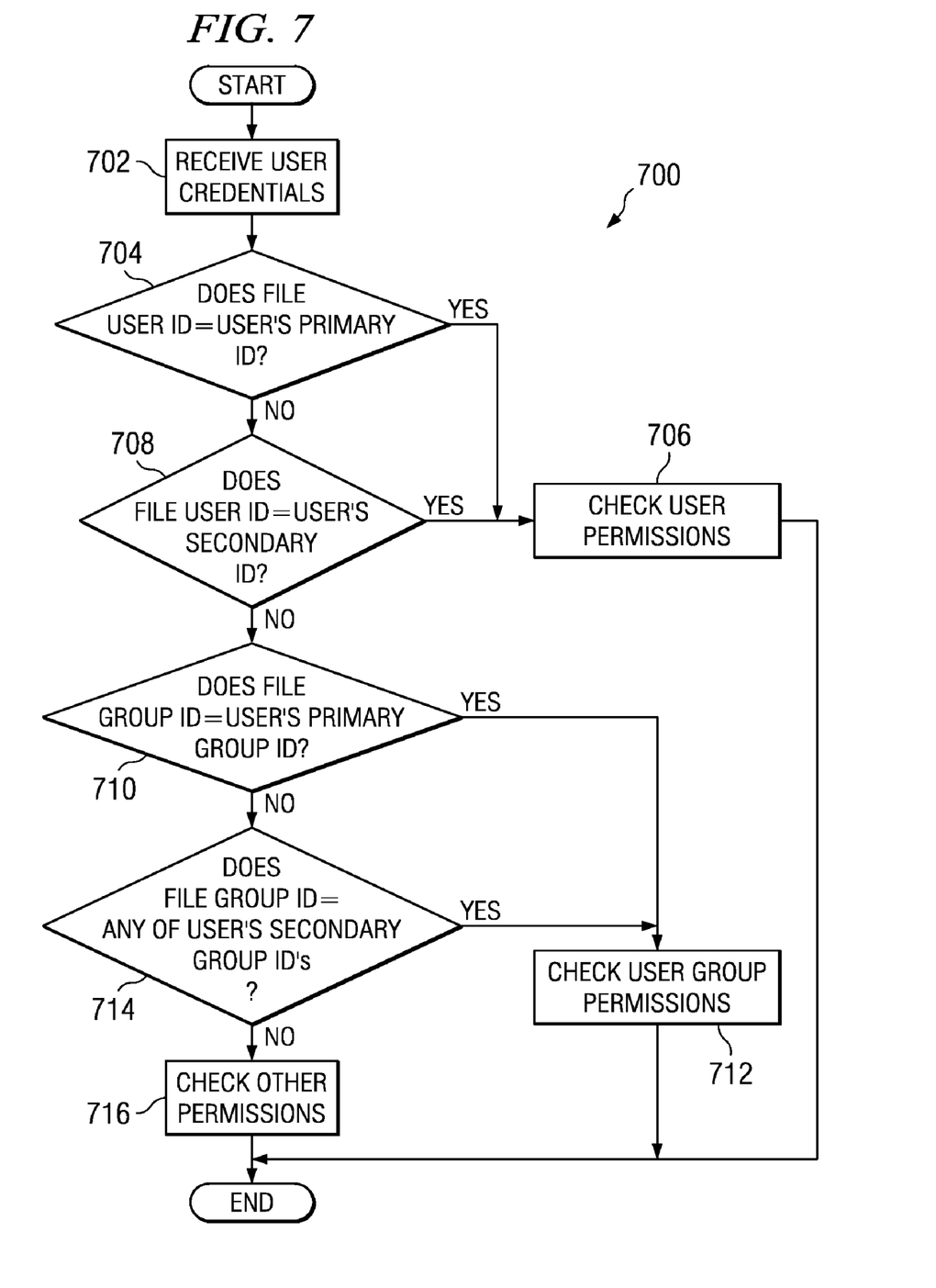
FIG. 7 is a flowchart of a method for checking file/directory access in accordance with an exemplary embodiment of the present invention.

FIG. 7 is a flowchart illustrating operation of file/directory access checking in accordance with exemplary aspects of the present invention. The operation of file/directory access checking is designated by reference number 700. Operation begins when the file/directory access checker, such as file/directory access checker 510 in FIG. 5, receives multi-user credentials, such as multi-user credentials 516 in FIG. 5, (step 702). A determination is made as to whether or not the file user ID matches the user's primary ID (step 704). If the file user ID does match the user's primary ID (a yes output from step 704), then the user permissions are checked (step 706) and operation ends. In the present example, it is presumed that there is only one owner of a file. The user ID of the owner is known as the file user ID. Therefore, once it has been determined that the user's primary ID matches the file user ID, there is no need to check any further as no other user ID can match the file user ID.

If the file user ID does not match the user's primary ID (a no output from step 704), then a determination is made as to whether or not the file user ID matches the user's secondary ID (step 708). If the file user ID does match the user's secondary ID (a yes output from step 708), then the user permissions are checked (step 706) and operation ends. If the file user ID does not match the user's secondary ID (a no output from step 708), a determination is made as to whether or not the file group ID matches the user's primary group ID (step 710).

If the file group ID does match the user's primary group ID (a yes output from step 710), then the user group permissions are checked (step 712) and operation ends. In the present example, it is presumed that, like with the file user ID, there is only one group ID for a file. Therefore, once it has been determined that the user's primary group ID matches the file group ID, there is no need to check any further as no other group ID can match the file group ID.

If the file group ID does not match the user's primary group ID (a no output from step 710), a determination is made as to whether or not the file group ID matches any of the user's secondary group IDs (step 714). The user's secondary group ID comprises of all secondary group IDs of the user's primary ID and all group ID of the user's secondary ID. If the file group ID does match one of the user's secondary group IDs (a yes output from step 714), then the user group permissions are checked (step 712) and operation ends. If the file group ID does not match one of the user's secondary group IDs (a no output from step 714), then other permissions are checked (step 716) and operation ends.

In an alternative embodiment, instead of checking for permissions and ending once a match for the file user ID has been found, operation continues by checking the file group ID against the multi-user credentials in order to find any matching group IDs. These two sets are compared and the user is granted the most permissive set of permissions of the two sets of permissions. Alternatively, the user could be granted the integrated set of permissions. In another embodiment, the user is granted the least permissive set of permissions of the two sets of permissions. Alternatively the user is granted access only based on those permissions that are common to both the sets of permissions While the examples detailed above have been described in terms of a system where there is only one file user ID and one file group ID for each file, one of ordinary skill in the art will recognize that the above detailed operation can apply to other implementations where there are more than one file user ID and file group ID associated with a file. In such cases, the file/directory access checking may operate as described, stopping after identifying a single instance of matching. In an alternate embodiment, the operation may be modified to check all of the multi-user credentials to determine all the matching IDs and permissions. In one embodiment, the user could then be granted the broadest, or most permissive, set of allowed permission to the files. All the permissions allowed to the multi-user credential are integrated and the user is granted the set of all the allowed, integrated permissions. In another embodiment, to ensure security, the user is granted the narrowest, or least permissive, set of allowed permissions. In one embodiment, all the permissions granted to the multi-user credentials are compared and the user is denied access based on the permissions belonging to the ID with the least permissions. Alternatively, all the permissions granted to the multi-user credentials could be compared and the user may be granted only those permissions that are common to all the IDs that have been granted access.

In another embodiment, once the multi-user credentials have been verified and access granted, the data processing system, such as local data processing system 602 in FIG. 6, may issue a command to a remote data processing system, such as remote data processing system 604 in FIG. 6. In an alternate embodiment, instead of the local data processing system verifying the multi-user credentials, the remote command along with the multi-user credentials may be transmitted to the remote data processing system, wherein the remote data processing system verifies the multi-user credentials and executes the remote command, pending the outcome of the verification.

Figure 8:
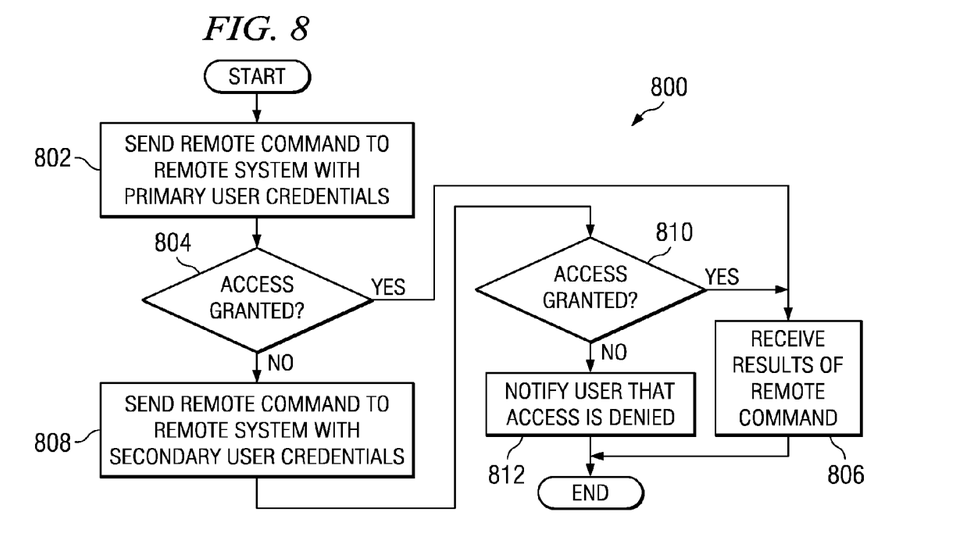
FIG. 8 is a flowchart of a method for executing a command on a remote data processing system in accordance with an exemplary embodiment of the present invention.

FIG. 8 is a flowchart illustrating operation of executing a command on a remote data processing system in accordance with exemplary aspects of the present invention. The operation of executing a remote command is designated by reference number 800 and begins when the local data processing system sends a remote command to a remote data processing system along with the primary user credentials (step 802). A determination is made as to whether or not access is granted (step 804). The determination may be based on a reply from the remote data processing system explicitly granting or denying access or other indicators may be used depending upon the implementation. If access is granted (a yes output from step 804), the local system receives the results of the remote command (step 806) and ends. The results of the remote command may take many forms including results of the executed command, a notification that the command was executed, or other indicators, depending upon the particular implementation.

If access is denied (a no output from step 804), the local data processing system sends the remote command to the remote data processing system along with the secondary user credentials (step 808). A determination is made as to whether or not access is granted (step 810). If access is granted (a yes output from step 810), the local system receives the results of the remote command (step 806) and ends. If access is denied (a no output from step 810), the user is notified that access to the remote system is denied (step 812) and operation ends.

It is important to note that while the above operation is described in terms of checking two sets of user credentials, primary and secondary, those of ordinary skill in the art will recognize that executing a remote command with multi-user credentials can be modified to continue sending the remote command to the remote data processing system coupled with other user credentials, continuing the process until all the credentials that a user possesses have been checked for access.

The invention can take the form of an entirely hardware embodiment, an entirely software embodiment or an embodiment containing both hardware and software elements. In an exemplary embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and digital video disk (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for supporting multiple user credentials, the method comprising:
   receiving user input from a given user including login information for a plurality of user accounts for the given user;
   authenticating, by a processor, the plurality of user accounts based on the login information;
   retrieving a plurality of credentials for the plurality of user accounts to form a multi-user credential; and
   responsive to a request for access to a file, verifying access rights to the file by verifying access rights of the multi-user credential.

2. The method of claim 1, wherein the login information includes a primary user identification, a primary password, a secondary user identification, and a secondary password.

3. The method of claim 1, wherein the plurality of credentials include a primary user identification, a primary group identification, a secondary user identification, and a plurality of secondary group identifications.

4. The method of claim 3, wherein verifying the access rights of the multi-user credential includes:
   comparing the primary user identification to a file owner identification associated with the file; and
   responsive to the primary user identification matching the file owner identification associated with the file, providing access to the file based on permissions associated with the file owner identification.

5. The method of claim 4, wherein verifying the access rights of the multi-user credential further includes:
   responsive to the primary user identification not matching the file owner identification associated with the file, comparing the secondary user identification with the file owner identification associated with the file; and
   responsive to the secondary user identification matching the file owner identification associated with the file, providing access to the file based on permissions associated with the file owner identification.

6. The method of claim 5, wherein verifying the access rights of the multi-user credential further includes:
   responsive to the secondary user identification not matching the file owner identification associated with the file, comparing the primary group identification with the file group identification associated with the file; and
   responsive to the primary group identification matching the file group identification associated with the file, providing access to the file based on permissions associated with the file group identification.

7. The method of claim 6, wherein verifying the access rights of the multi-user credential further includes:
   responsive to the primary group identification not matching the file group identification associated with the file, comparing the plurality of secondary group identification with the file group identification associated with the file; and
   responsive to one of the plurality of secondary group identifications matching the file group identification associated with the file, providing access to the file based on permissions associated with the file group identification.

8. The method of claim 1, wherein access includes execution.

9. The method of claim 8, wherein execution takes place on a remote data processing system.

10. A computer program product comprising:
   a non-transitory computer usable medium including computer usable program code for supporting multiple user credentials, said computer program product including:
      computer usable program code for receiving user input from a given user including login information for a plurality of user accounts for the given user;
      computer usable program code for authenticating the plurality of user accounts based on the login information;
      computer usable program code for retrieving a plurality of credentials for the plurality of user accounts to form a multi-user credential; and
      computer usable program code, responsive to a request for access to a file, for verifying access rights to the file by verifying access rights of the multi-user credential.

11. The computer program product of claim 10, wherein the login information includes a primary user identification, a primary password, a secondary user identification, and a secondary password.

12. The computer program product of claim 10, wherein the plurality of credentials include a primary user identification, a primary group identification, a secondary user identification, and a plurality of secondary group identifications.

13. The computer program product of claim 12, wherein the computer usable program code for verifying access rights to the file by verifying the access rights of the multi-user credential includes:
   computer usable program code for comparing the primary user identification to a file owner identification associated with the file; and
   computer usable program code, responsive to the primary user identification matching the file owner identification associated with the file, for providing access to the file based on permissions associated with the file owner identification.

14. The computer program product of claim 13, wherein the computer usable program code for verifying access rights to the file by verifying the access rights of the multi-user credential further includes:
   computer usable program code, responsive to the primary user identification not matching the file owner identification associated with the file, for comparing the secondary user identification with the file owner identification associated with the file; and
   computer usable program code, responsive to the secondary user identification matching the file owner identification associated with the file, for providing access to the file based on permissions associated with the file owner identification.

15. The computer program product of claim 14, wherein the computer usable program code for verifying access rights to the file by verifying the access rights of the multi-user credential further includes:
   computer usable program code, responsive to the secondary user identification not matching the file owner identification associated with the file, for comparing the primary group identification with the file group identification associated with the file; and computer usable program code, responsive to the primary group identification matching the file group identification associated with the file, for providing access to the file based on permissions associated with the file group identification.

16. The computer program product of claim 15, wherein the computer usable program code for verifying access rights to the file by verifying the access rights of the multi-user credential further includes:

computer usable program code, responsive to the primary group identification not matching the file group identification associated with the file, for comparing the plurality of secondary group identification with the file group identification associated with the file; and computer usable program code, responsive to one of the plurality of secondary group identifications matching the file group identification associated with the file, for providing access to the file based on permissions associated with the file group identification.

17. A data processing system for supporting multiple user credentials, the data processing system comprising:

a bus system;

a communications system connected to the bus system;

a memory connected to the bus system, wherein the memory includes computer usable program code; and a processing unit connected to the bus system, wherein the processing unit executes the computer usable program code to:

receive, using a login shell, user input from a given user including login information for a plurality of user accounts for the given user and authenticates the plurality of user accounts based on the login information;

retrieve, using an operating system component, a plurality of credentials for the plurality of user accounts to form a multi-user credential; and verify, using a file access checking component, access rights to the file by verifying access rights of the multi-user credential.

18. The data processing system of claim 17, wherein the login information includes a primary user identification, a primary password, a secondary user identification, and a secondary password.

19. The data processing system of claim 17, wherein the plurality of credentials include a primary user identification, a primary group identification, a secondary user identification, and a plurality of secondary group identifications.

* * * * *